United States Patent [19]
Godse

[11] Patent Number: 5,991,544
[45] Date of Patent: Nov. 23, 1999

[54] PROCESS AND APPARATUS FOR MANAGING A SOFTWARE LOAD IMAGE

[75] Inventor: Dhananjay Godse, Kanata, Canada

[73] Assignee: Nortel Networks Corporation, Montreal, Canada

[21] Appl. No.: 08/987,251

[22] Filed: Dec. 9, 1997

[51] Int. Cl.[6] ....................................................... G06F 9/45
[52] U.S. Cl. ............................................................. 395/712
[58] Field of Search ............................................. 395/712

[56] References Cited

U.S. PATENT DOCUMENTS

| | | | |
|---|---|---|---|
| 5,410,651 | 4/1995 | Sekizawa et al. | 395/200.54 |
| 5,519,866 | 5/1996 | Lawrence et al. | 395/710 |
| 5,655,081 | 8/1997 | Bonnell et al. | 395/200.32 |
| 5,668,992 | 9/1997 | Hammer et al. | 395/651 |
| 5,742,829 | 4/1998 | Davis et al. | 395/712 |
| 5,745,568 | 4/1998 | O'Connor et al. | 380/4 |
| 5,761,499 | 6/1998 | Sonderegger | 395/610 |
| 5,778,231 | 7/1998 | Van Hoff et al. | 395/705 |
| 5,826,239 | 10/1998 | Du et al. | 705/8 |
| 5,857,107 | 1/1999 | Tsuchida | 395/712 |
| 5,859,969 | 1/1999 | Oki et al. | 395/200.3 |

*Primary Examiner*—Tariq R. Hafiz
*Assistant Examiner*—Wei Zhen

[57] ABSTRACT

The present invention relates to a method and apparatus to permit a computer to manage its software load image. This operation takes place when the computer powers on and when a new software sub-system is dynamically loaded into an address space where a software load is already running. During the booting procedure, after the operating system has been initialized, software sub-systems are started. Typically the linker-loader module of the operating system resolves symbol references for each sub-system, allocates memory and then starts the sub-systems. The novel method involves the additional step of registering the sub-system in an in-memory location, herein designated as load description database, before starting the sub-system. Similarly, when a sub-system is removed from a computer, it registers with the load description database indicating that it has been removed. The result is that the load description database always reflects the sub-systems present on the computer at any given time. The invention also provides a machine-readable medium comprising a program element to implement the load image management process.

22 Claims, 6 Drawing Sheets

PROCESS AND APPARATUS FOR MANAGING A SOFTWARE LOAD IMAGE

FIELD OF THE INVENTION

This invention relates to a process and apparatus for permitting a computer to manage a software load image. It is applicable to computers, particularly those operating in a distributed network environment, and may be used to allow the individual computers to determine which software modules are in their load. The invention also provides a computer readable storage medium containing a program element to direct a computer to implement the load image management process.

BACKGROUND

Computers, particularly server units, may have several active software sub-systems in memory at one time. These software sub-systems are managed using what is commonly called a software load image. The software load image describes the software sub-systems in the software load of a computer.

Difficulties are frequently encountered when managing these software loads. The first problem occurs because of the way in which software loads are created and packaged. Commonly, when a software load is created, many sub-systems are included which are not required in all configurations and hence are considered to be optional. The second problem occurs because the software load of a computer is often dynamic in nature. For example, during the operating period of a computer, some software modules may be removed and some may be added. The exact set of software modules in a load image is therefore difficult to manage especially when there are large numbers of optional software modules and when sub-systems are added or removed.

A common solution to this problem is to package all software sub-systems, including optional sub-systems, in a single load image and then enable only the optional sub-systems required using a key. This will permit storing a single image while allowing a large number of possible combinations through the use of the key. Using this solution, if a sub-system is dynamically added inito the load after the system is up and running, the load image can be updated by changing the key. However, although this solution works, a large section of the computer memory and/or hard disk is taken up by disabled software, which is clearly inefficient.

Another common solution to this problem is to build custom software loads where the customizing happens by having a specific subset of all possible optional software sub-systems build into the software load. Each of the custom software loads is then associated with a load identifier. These load identifiers are then stored in a load table in a memory device. A load table typically contains an entry for each possible permutation of the software load optional sub-systems. For example, a software product with four (4) optional sub-systems has 16 possible permutations and load table entries while a software product with six (6) optional sub-systems has 64 permutations and load table entries. The number of permutations is computed by the following equation:

$$\sum_{r=0}^{n} \binom{n}{r} = 2^n \qquad \text{Equation 1}$$

where n is the number of optional sub-systems and $$\binom{n}{r}$$

are the binomial coefficients. This number of permutations is potentially the number of load table entries needed for the optional sub-systems. As shown in equation 1, this number increases exponentially with the number of optional sub-systems yielding a large number of load identifiers that must be stored and managed. In addition, requesting the load image of a computer often involves a configuration management entity that coordinates the access to the software load table. In a typical interaction, a system management unit queries a computing node that is remote from the system management unit, requesting to know what software sub-systems are in its load, The computing node locates its load identifier and returns it to the system management unit. Following this, the system management unit sends a message to a configuration management unit that may also be also remote from the system management unit, requesting the load image associated to the Load. The system configuration management unit searches a load table for the entry with the corresponding Load and returns the load image to the system management unit. In addition to having large storage requirements for the software load table, this method does not allow to easily modify the software load image when adding software sub-systems. In effect, if a new sub-system is dynamically added into the load after the system is up and running the load image is no longer accurate. The implication is to have either an inaccurate load image or to search for the load identifier that suits the revised combination which is impractical even for a small number of optional modules.

Thus, there exists a need in the industry to provide an improved method and apparatus to permit computing devices to manage a software load image particularly well suited to software load with a large number of optional sub-systems and permitting the load image to be dynamically updated, particularly when sub-systems are being activated.

OBJECTS AND STATEMENT OF THE INVENTION

An object of this invention is to provide a novel method and apparatus for managing the software load image of a computing apparatus.

Yet another object of the invention is to provide a computer-readable storage medium implementing a program element for managing the software load image of a computing apparatus.

As embodied and broadly described herein the invention provides a machine-readable storage medium comprising:

a) a first data structure forming a symbol table associated with at least one software entity, said data structure including an entry constituting a registration trigger for said at least one software entity;

b) a second data structure forming a load description database, said load description database capable of holding a plurality of entries indicative of respective software entities in an active state;

c) a program element implemeiling an application initialization module, said application initialization module capable of processing said symbol table and in response to said registration trigger causing creation of an entry in said load description database associated with said at least one software entity and indicative that said at least one software entity is in an active state.

For the purposes of this specification the expression "loader" refers to a program element that is designed to take a software entity that is in the inactive state, such as stored on a mass storage device, and places that software entity in memory, such as the RAM of the computer, at a certain address, so that execution of that software entity can begin. The loader is designed to search a symbol table in order to provide address resolution. Here "loader" is defined in a broad sense and may include the functionality of a "linker" that generates load modules from a collection of object modules. That collection results from the contiguous joining of the object modules, where the address references in one object module to addresses in other object modules have been resolved.

The expression "symbol table" refers to a data structure associated with the software entity that contains symbols, that can be either internal or external to the software entity and that constitute pointers to memory address locations. The loader is thus capable of processing the symbol table to associate to one or more of the symbol an address location that will be used during the execution of the software entity. Generally speaking, loaders (loaders-linkers) are programs well known to those skilled in the art and a detailed description of their operation is not deemed necessary for the understanding of the invention. For more information on the operation and structure of loaders, the reader is invited to refer to the book "Operating systems" from William Stallings, Prentice Hall, Englewood Cliffs N.J. 07632, whose contents are incorporated herein by reference.

For the purpose Of this specification, the expression "local site" refers to a location that is in the computer itself or, generally speaking, is part of the computer. For example, a disk drive either internal or external is considered local because it is integrated to the structure of the computer. On the other hand "remote site" is considered a location holding components that are not normally part of the computer, but with which the computer may be able to communicate. For example another computer node in a network to which the computer is connected is considered to be "remote" because the other computer node is normally a separate device from the computer, although the computer can communicate with that node through a predetermined protocol to exchange data.

For the purpose of this specification the expression "non-volatile storage" is used to designate a storage unit that maintains its contents even if the storage device has no power such as non-volatile RAM (NVRAM) or a hard-disk.

In the preferred embodiment of this invention, the software load management process is used in a computer node operating in a distributed computing environment and is used to permit the computer to initialize its software load image when the computer is first booted. In a typical interaction, after the computer is turned on, the operating system is initialized. Following this, an application initialization module that is part of the loader, proceeds in registering the software entities, such as any software sub-systems, as mail daemons, etc. in the software load and starting their execution. The first step in the registration process involves searching a symbol table for a registration trigger that can be in the form of a certain registration procedure name. Each software sub-system includes a registration procedure, and the name of that procedure is placed in the symbol table. Most preferably, the name of the registration procedure includes a generic component to enable the application initialization module to clearly identify the entry from other entries in the symbol table. After the registration procedure with the pre-determined name or identifier has been located in the symbol table, the registration procedures are executed. These procedures include code to register the existence of the software sub-system in a certain file with the computer node. Preferably, the registration procedure also includes the names of the procedure to start and stop the software sub-system as well as other useful information. The registration information namely the sub-system name, start and end functions are recorded in a file located in the local memory unit of the computer node, herein referred to as load description database. After the registration has taken place, the sub-systems are initialized and begin execution.

The process described above is effected when the system is being booted. A similar procedure can be implemented when a software entity is activated, to dynamically update the load description database. As with the software entities activated at booting time, the application initialization module searches the symbol table of the software entity to be currently activated. When the registration trigger is found an entry is created in the load description database, to update the database that now reflects the fact that the new software entity is active. This feature provides a system that allows to maintain an accurate load description database.

Most preferably, external entities are allowed to query the load description database on the current node in order to determine what software is presently active. In a typical interaction, a network system manager may need to known what is the software load image in a computer node. The system manager obtains this information by sending a request to the node to receive the load image. This request is processed by the local computer that transmits the load description database in any suitable format to the network system manager.

As embodied and broadly described herein the invention also provides a computing apparatus, comprising a memory including:
  a) a first data structure forming a symbol table associated with at least one software entity, said data structure including an entry constituting a registration trigger for said at least one software entity;
  b) a second data structure forming a load description database, said load description database capable of holding a plurality of entries indicative of respective software entities in an active state;
  c) a program element implementing an application initialization module, said application initialization module in response to said registration trigger causing creation of an entry in said load description database associated with said at least one software entity and indicative that said at least one software entity is in an active state.

As embodied and broadly described herein the invention also provides a method for managing a software load image of a computer including a memory in which resides a thirst data structure forming a symbol table associated with at least one software entity, said data structure including an entry constituting a registration trigger for said at least one software entity, said method comprising the steps of:
  invoking a linker to search entries in said symbol table to identify said registration trigger;
  upon location of said registration trigger causing creation of an entry in a load description As embodied and broadly described herein, the invention also provides a method for managing a software load image of a computer including a memory in which resides a first data structure forming a symbol table associated with at least one software entity, said data structure including an entry constituting a registration trigger for said at least one software entity, said method comprising the steps of:

invoking a linker to search entries in said symbol table to identify said registration trigger;

upon on location of said registration trigger causing creation of an entry in a load description database associated with said at least one software entity and indicative that said at least one software entity is in an active state.

BRIEF DESCRIPTION OF THE DRAWINGS

These and other features of the present invention will become apparent from the following detailed description considered in connection with the accompanying drawings. It is to be understood, however, that the drawings are designed to purposes of illustration only and not as a definition of the limits of the invention for which reference should be made to the appending claims.

DESCRIPTION OF A PREFERRED EMBODIMENT

The present invention is directed to a process that allows a computer to manage its software load image, In the preferred embodiment of this invention, this operation takes place when the computer powers up and/or when a new software sub-system is dynamically loaded into the address space of a software load image already running on a computer. It may also take place when a sub-system is removed from the address space. Preferably, the load image management is done without any configuration management unit or network management entity.

Figure 1:
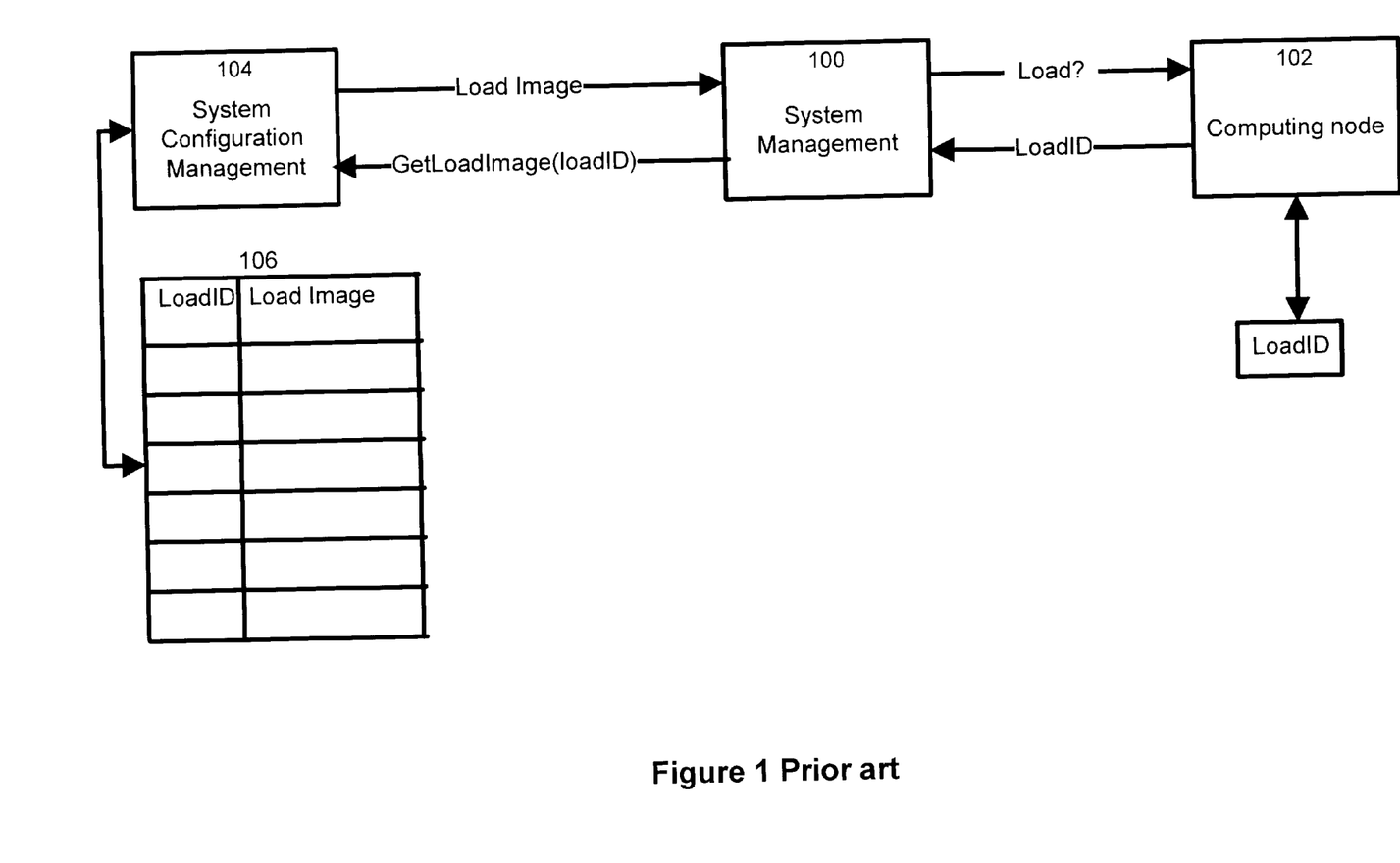
FIG. 1 shows a block diagram of a network system in the process of establishing the software load of a computer, in accordance with prior art techniques.

In prior art systems, requesting the load image of a computer often involves a configuration management entity that coordinates the access to the software load table. In a typical interaction, as shown in FIG. 1, a system management unit 100 queries a computing node 102 that is remote from the system management unit 100, requesting to know what software sub-systems are in its load. The computing node 102 locates its load identifier and returns it to the system management unit 100. Following this, the system management unit 100 sends a message to a configuration management unit 104 that may also be remote from the system management unit 100, requesting the load image associated to the Load. The system configuration management unit 104 searches a load table 106 for the entry with the corresponding Load and returns the load image to the system management unit 100. in addition to having large storage requirements for the software load table, this method does not allow to easily modify the software load image when adding software sub-systems. In effect, if a new sub-system is dynamically added into the load after the system is up and running the load image is no longer accurate. The implication is to have either an inaccurate load image or to search for the load identifier that suits the revised combination which is impractical even for a small number of optional modules.

Figure 2:
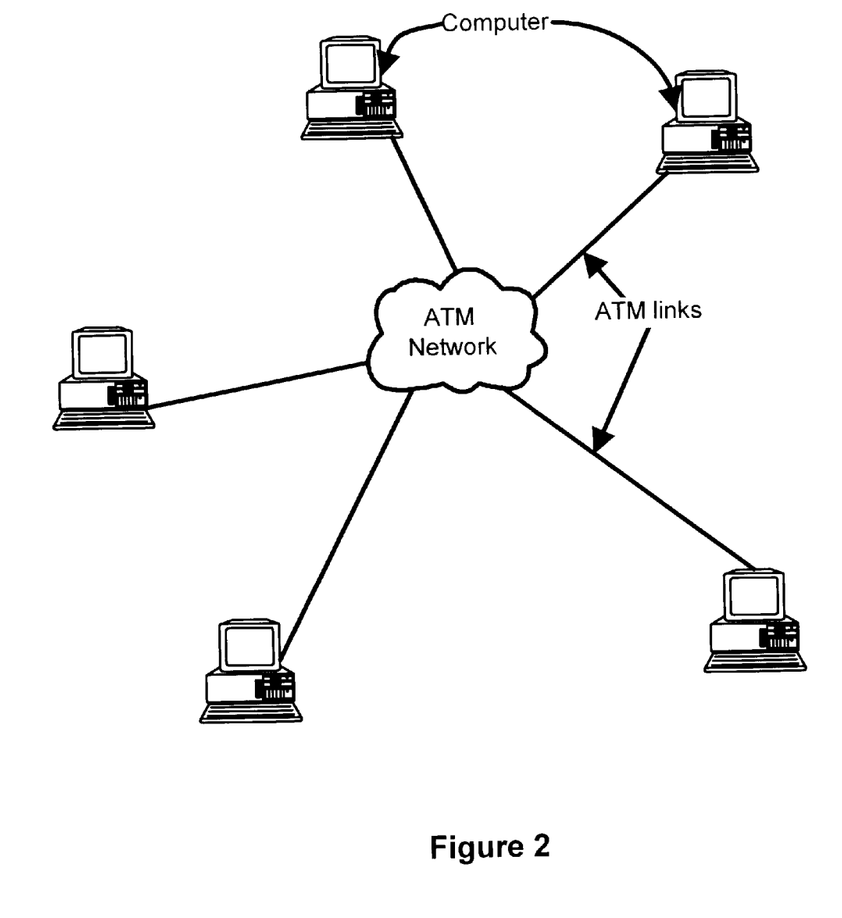
FIG. 2 shows a distributed computing network where The process in accordance with this invention can be implemented.

Computers that may make use of the load image management process in accordance with this invention may be used in stand-alone mode or be of a distributed nature, as shown in FIG. 2. These machined, herein designated as nodes, may reside in geographically remote locations, and may communicate using a set of predefined protocols. Protocols such as TCP/IP, client/server architecture and message passing are all possible methods of achieving a distributed computing environment. For more information on distributed processing, the reader is invited to consult Operating Systems by William Stallings, Prentice Hall $2^{nd}$ edition 1995. The text of this document is included herein by reference.

Figure 4:
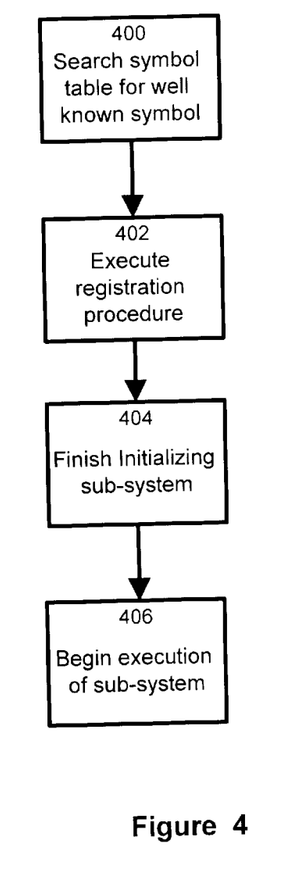
FIG. 4 shows a flow chart of the software load image initialization procedure.

In a typical interaction, as shown in FIG. 4, after the computer node has been powered on, the booting process starts. A typical part of the booting process is to initialize the operating system. In the preferred embodiment of this invention, the operating system "VX works" by Wind River Systems, Inc. is used. Other operating systems may be used here without departing from the spirit of Lie invention provided that there is a means to access the symbol table of the software load. After the operating system has been started, software entities, (hereinafter referred to as "sub-systems") are initialized. In the preferred embodiment, the sub-systems may be server modules such as FTP servers, mail daemons as well as other applications. Each sub-system includes a procedure, herein designated as registration procedure, whose name includes a pre-determined identifier. In the preferred embodiment this identifier is a text string. For example, the procedure may be called "<sub-system_name>_MODINIT( )" where "_MODINIT" is the pre-determined string located at the end of the procedure or sub-routine name. That string is generic and permits to identify the function of the procedure that is to register the procedure once it has been loaded in the RAM of the computer where execution can start. For example, if the sub-system name is "foo" then the procedure will be called "_MODINIT( )". Alternatively the pre-determined string may be located at the beginning or in the middle of the function or sub-routine name. The pre-determined string as well as its location within the procedure name is a coding convention. Other variations with pre-determined identifiers may be used without departing from the spirit of the invention.

The first step of the sub-system registration process 400 involves searching the symbol table of the sub-system for procedures with the pre-determined identifiers. Typically, the symbol table is created when the source code of an application is first compiled and the object code is created. Most software development systems use loaders to aggregate separately compiled object modules into a single software load image that is the program to be run. The aggregation is performed by the loader maintaining a table of global symbols, updating the symbol table with the global symbol of each new module and resolving the addresses of referenced symbols. In the preferred embodiment of this invention, a modified loader module of the operating system is used. In addition to resolving symbol references and allocating memory for the new module, the modified loader would also run an application initialization module to complete the registration procedure with the pre-determined identifier. The application initialization module is part of the loader. One possibility to implement the application initialization module is to provide a procedure internal to the loader that is called when the identifier, in this example "__MODINIT", is encountered. As the loader processes each entry in the symbol table, the entries are examined for match with the identifier "__MODINIT". When an entry containing this identifier is found the application initialization module is called to register the existence of the sub-system with the computer node. Preferably, the registration procedure also includes the names of the procedure to start and stop the sub-system as well as other useful information. The application initialization module will essentially create an entry in the load description database, that is a file residing at a known location or having a predetermined name, and holding the names of all the active sub-systems. As mentioned earlier, this entry indicates that the associated sub-system is active and may also contain additional information. This type of procedures capable of creating an entry in a file can be easily implemented and there is no need to describe the implementation details here.

Figure 3:
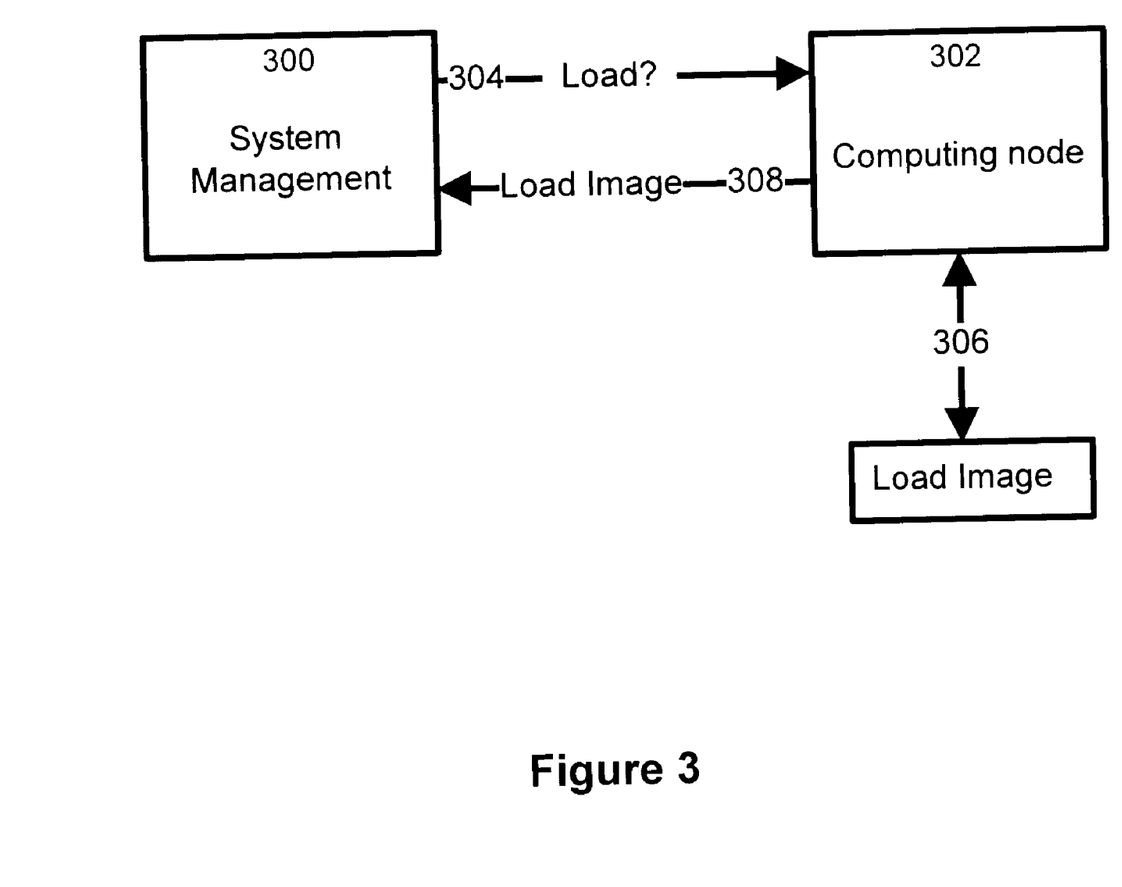
FIG. 3 shows a load image management architecture in accordance with the spirit of the invention.

After the registration has taken place, the sub-systems are initialized 404 and begin execution 406. In some circumstances, the system manager may need to known what is the software load image in a computer node. In the preferred embodiment, the system manager obtains this information by sending a request to the node to receive the load image. FIG. 3 shows a typical interaction between the system management unit 300 and a computing node 302 for managing software load images in accordance with the spirit of the invention. In a typical interaction, the system management unit 300 queries the computing node 302 requesting to know what software is in its load. The computing node 302 locates its load image and returns it to the system management unit 300. The response may include the entire file or certain portions of the file, as is deemed appropriate.

Figure 5:
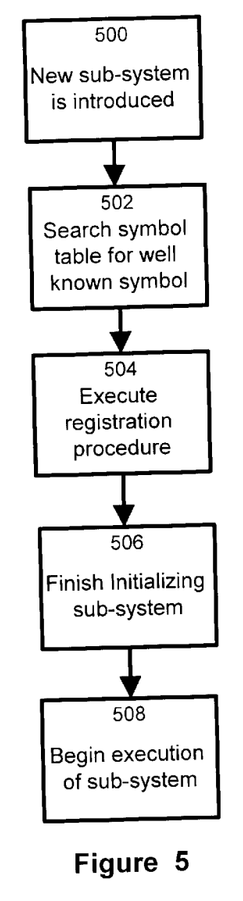
FIG. 5 shows a flow chart of the software load image procedure when a sub-system is introduced.

After the computer system is in operation and the software sub-systems have been initialized, a new sub-system is introduced in the computer system 500, as shown in FIG. 5. As was the case for the other sub-systems, the symbol table of the new sub-system is searched 502 for procedures designated with a name including a pre-determined identifier. For example, the procedure may be called "<sub-system_name>__MODINIT( )" where "__MODINIT" is the pre-determined string located at the end of the procedure or sub-routine name. After the procedures with the pre-determined identifier have been located in the symbol table, the registration procedures are executed 504 entering the required info into the load description database. After the registration has taken place, the new sub-system is initialized 506 and can begin execution 508.

Figure 6:
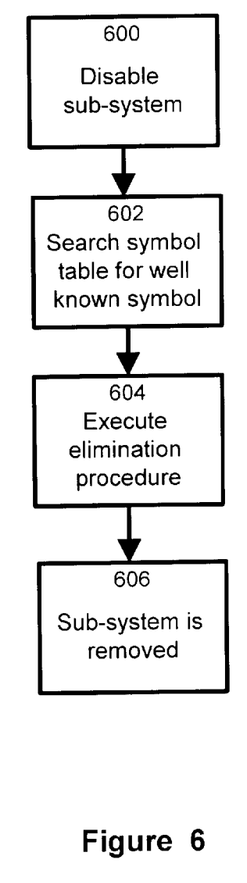
FIG. 6 shows a flow chart of the software load image procedure when a sub-system is removed.

In another instance, after the computer system is in operation and the software sub-systems have been initialized, a sub-system can be withdrawal from the computer system. In a typical interaction, as shown in FIG. 6, after the sub-system is disabled 600, the symbol table of the sub-system is searched 602 for procedures designated with a name including a pre-determined identifier different from the name of the registration identifier. For example, the procedure may be called "<sub-system_name>__MODDESTROY( )" where "__MODDESTROY" is the pre-determined string located at the end of the procedure or sub-routine name. After the procedures with the pre-determined identifier, herein referred to as the elimination procedures, have been located in the symbol table, they are executed 604. These procedures include code Lo search the load description database and remove the references to the sub-system being disabled. The registration information namely the sub-system name, start and end functions are also eliminated from the load description database. After the references of the sub-system have been eliminated from the load description database, the sub-system can be removed 606.

Although the present invention has been described in considerable detail with reference to certain preferred embodiments thereof, variations and refinements are possible without departing from the spirit of the invention. For example, a computing unit managing multiple address space may include a load description database for each address space thereby maintaining an independent software load image for each address space. Therefore, the scope of the invention should be limited only by the appended claims and their equivalents.

I claim:

1. A machine-readable storage medium comprising a program element for execution by a computer node for managing a software load image of the computer node, said machine readable medium comprising:

a) a first data structure forming a symbol table for holding at least one entry constituting a registration trigger associated to a software entity;

b) a second data structure forming a load description database for holding a plurality of entries indicative of respective software entities executed on the computer node, whereby an entity external to the computer node can query said load description database to obtain the software load image of the computing node;

c) the program element being operative for:
      i) processing said symbol table to locate a registration trigger;
      ii) in response to location of a registration trigger creating an entry in said load description database, the entry created in said load description database being indicative that the software entity associated with the registration trigger is being executed on the computer node;
      iii) causing execution of the software entity.

2. A machine-readable storage medium as defined in claim 1, wherein said program element forms part of a loader.

3. A machine-readable storage medium as defined in claim 2, wherein said registration trigger includes a predetermined string of characters.

4. A machine-readable storage medium as defined in claim 3, wherein said loader provides means to process entries in said symbol table to search for said pre-determined string of characters, upon identification of said predetermined string of characters said program element in said loader causing the creation of the entry in said load description database.

5. A machine-readable storage medium as defined in claim 4, wherein the entry created in said load-description database includes a first identifier indicative of a procedure associated to said software entity that when invoked terminates said software entity.

6. A machine-readable storage medium as defined in claim 5, wherein the entry created in said load-description database includes a second identifier indicative of a procedure associated to said software entity that when invoked activates said software entity.

7. A machine-readable storage medium as defined in claim 6, wherein said load-description database is a file.

8. A machine-readable storage medium as defined in claim 1, wherein the machine-readable storage medium is the RAM of a computing apparatus.

9. A method for managing a software load image of a computer node including a memory in which resides a first data structure forming a symbol table for holding at least one entry constituting a registration trigger associated to a software entity, said symbol table being associated with at least one software entity, said method comprising;

invoking a linker to process said symbol table to locate a registration trigger;

on location of said registration trigger creating an entry in a load description database, whereby an entity external to the computing node can query said load description database to obtain the software load image of the computing node, the entry created in the load description database being indicative that the software entity associated with the registration trigger is being executed on the computer node;

causing execution of the software entity.

10. A method as defined in claim 9, wherein said registration trigger includes a predetermined string of characters.

11. A method as defined in claim 10, wherein the entry created in said load-description database includes a first identifier indicative of a procedure associated to said software entity that when invoked terminates said software entity.

12. A method as defined in claim 11, wherein the entry created in said load-description database includes a second identifier indicative of a procedure associated to said software entity that when invoked activates said software entity.

13. A method as defined in claim 12, wherein said load-description database is a file.

14. In combination:

a) a first computing node;

b) a second computing node in a data communicative relationship with said first computing node, said second computing node including a machine-readable storage medium comprising a program element for execution by the second computing node for managing a software load image of the second computing node, said computer readable storage medium comprising:

i) a first data structure forming a symbol table for holding at least one entry constituting a registration trigger associated to a software entity;

ii) a second data structure forming a load description database for holding a plurality of entries indicative of respective software entities executed on the second computing node, whereby an entity external to the second computing node can guery said load description database to obtain the software load image of the second computing node;

iii) the program element being operative for:

processing said symbol table to locate a registration trigger;

in response to location of a registration trigger creating an entry in said load description database, the entry created in said load description database being indicative that the software entity associated with the registration trigger is being executed on the second computing node;

causing execution of the software entity on said second computing node;

said second computing node being responsive to a message from said first computing node to transmit to said first computing node data originating from said second data structure.

15. A computing apparatus for managing a software load image of a computer node, said apparatus comprising a memory including:

a) a first data structure forming a symbol table for holding at least one entry constituting a registration trigger associated to a software entity;

b) a second data structure forming a load description database for holding a plurality of entries indicative of respective software entities executed on the computer node, whereby an entity external to the computer node can query said load description database to obtain the software load image of the computer node;

c) the program element being operative for:

i) processing said symbol table to locate a registration trigger;

ii) in response to location of a registration trigger creating an entry in said load description database, the entry created in said load description database being indicative that the software entity associated with the registration trigger is being executed on the computer node;

iii) causing execution of the software entity.

16. An apparatus as defined in claim 15, wherein said application program element forms part of a loader.

17. An apparatus as defined in claim 16, wherein said registration trigger includes a predetermined string of characters.

18. An apparatus as defined in claim 17, wherein said loader is operative to process entries in said symbol table to search for said pre-determined string of characters, upon identification of said predetermined string of characters said program element in said loader causing the creation of the entry in said load description database.

19. An apparatus as defined in claim 18, wherein the entry created in said load-description database includes a first identifier indicative of a procedure associated to said software entity that when invoked terminates said software entity.

20. An apparatus as defined in claim 19, wherein the entry created in said load-description database includes a second identifier indicative of a procedure associated to said software entity that when invoked activates said software entity.

21. An apparatus as defined in claim 20, wherein said load-description database is a file.

22. An apparatus as defined in claim 15, wherein said memory is the RAM of a computing apparatus.

\* \* \* \* \*

UNITED STATES PATENT AND TRADEMARK OFFICE
CERTIFICATE OF CORRECTION

PATENT NO. : 5,991,544
DATED : November 23, 1999
INVENTOR(S) : Dhananjay GODSE

It is certified that error appears in the above-identified patent and that said Letters Patent is hereby corrected as shown below:

Column 1, line 43, change « inito » to --into--
Column 2, line 23, change « Load » to --LoadID--
Column 2, line 25, change « Load » to --LoadID--
Column 2, line 64, change « implemeiling » to --implementing--
Column 3, line 33, change « Of » to --of--
Column 4, line 57, change « thirst » to --first--
Column 4, line 65, after the word « description » add
--database associated with said at least one software
entity and indicative that said at least one software
entity is in an active state--
Column 5, line 20, change « to » to --for--
Column 5, line 26, change « The » to --the--
Column 5, line 61, delete --also--
Column 5, line 63, change « Load » to --LoadID--
Column 5, line 65, change « Load » to --LoadID--
Column 5, line 66, change « in » to --In--

UNITED STATES PATENT AND TRADEMARK OFFICE
CERTIFICATE OF CORRECTION

PATENT NO. : 5,991,544
DATED : November 23, 1999
INVENTOR(S) : Dhananjay GODSE

It is certified that error appears in the above-identified patent and that said Letters Patent is hereby corrected as shown below:

Column 6, line 12, change « machined » to --machines--
Column 6, line 28, change « Lie » to --the--
Column 6, line 46, change « __MODINIT() » to --foo__MODINIT()--
Column 7, line 56, change « withdrawal » to --withdrawn--
Column 8, line 1, change « Lo » to --to--

Signed and Sealed this

Twenty-second Day of August, 2000

Attest:

Q. TODD DICKINSON

*Attesting Officer*  *Director of Patents and Trademarks*